US 6,311,230 B1

(54) SYSTEM AND METHOD FOR CELL SWITCHING WITH A PERIPHERAL COMPONENT INTERCONNECT BUS AND DECENTRALIZED, COMPUTER-CONTROLLED CELL SWITCH

(75) Inventors: Robert E. Cochran, Morganville; John M. Madden, Fairhaven; Frederick H. Meyer, Neptune; David R. Rhee, Old Bridge; Arthur J. Wilton, East Brunswick, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/998,533

(22) Filed: Dec. 26, 1997

Related U.S. Application Data

(60) Provisional application No. 60/034,451, filed on Dec. 27, 1996.

(51) Int. Cl.[7] ............................. G06F 3/00; G06F 13/368; H04L 12/28; H04L 12/56
(52) U.S. Cl. ................................. 710/5; 710/119; 710/242; 370/396
(58) Field of Search .................................... 709/201, 212, 709/231, 243; 710/119, 131, 242, 5; 370/390, 396

(56) References Cited

U.S. PATENT DOCUMENTS

| 4,535,453 | * | 8/1985 | Rhodes et al. ..................... 370/110.1 |
| 5,450,411 | * | 9/1995 | Heil .................................... 370/94.2 |
| 5,689,644 | * | 11/1997 | Chou et al. ....................... 395/200.06 |
| 5,758,109 | * | 5/1998 | Gafford et al. ....................... 395/308 |
| 5,787,095 | * | 7/1998 | Myers et al. ........................ 371/68.1 |
| 6,072,798 | * | 6/2000 | Beasley .............................. 370/395 |
| 6,101,184 | * | 8/2000 | Tobe et al. ........................... 370/390 |

* cited by examiner

Primary Examiner—Thomas Lee
Assistant Examiner—Chun Cao

(57) ABSTRACT

A port card employable in a cell switch including a host computer having a processor and a bus for interconnecting a plurality of port cards and a method of switching cells in the cell switch. The port card includes: (1) bus master circuitry for gaining control of the bus to allow the port card to place cells to be switched in the cell switch on the bus and (2) interface circuitry, coupled to the local memory and the bus master circuitry, that places the cells on the bus when the bus master circuitry has gained control of the bus, the cells communicated directly from the interface circuitry to another port card in the cell switch via the bus. The processor (or, more generally, the host computer) is relieved of having to participate directly in switching the cells.

21 Claims, 4 Drawing Sheets

SYSTEM AND METHOD FOR CELL SWITCHING WITH A PERIPHERAL COMPONENT INTERCONNECT BUS AND DECENTRALIZED, COMPUTER-CONTROLLED CELL SWITCH

CROSS-REFERENCE TO RELATED APPLICATION

This Application claims the benefit of U.S. Provisional Application Ser. No. 60/034,451, filed on Dec. 27, 1996, and entitled "System and Method for Cell Switching with a Peripheral Component Interconnect Bus and Decentralized, Computer-Controlled Cell Switch," commonly assigned with the present invention and incorporated herein by reference.

TECHNICAL FIELD OF THE INVENTION

The present invention is directed, in general, to telephone switches and, more specifically, to a system and method for cell switching that employs a peripheral component interconnect ("PCI") bus and a decentralized, computer-controlled cell switching architecture.

BACKGROUND OF THE INVENTION

Modern communications networks comprise a plurality of endpoints (such as telephones and computers) linked together via a corresponding plurality of lines, allowing the endpoints to be interconnected to route voice, video and data traffic (hereinafter collectively referred to as "data" or "payload") from any one endpoint through the network to any other endpoint. Interconnection of the lines is conventionally performed at central locations (or "offices") that contain one or more switches.

Conventional analog switches comprise a matrix of interconnects that allow the switch to couple any two of the lines together, thereby creating a connection and allowing data to cross from one line to the other. Although most lines in an analog network carry only a single stream of analog data, time division multiplexing ("TDM") has traditionally been employed to divide a single physical line into fixed-length time slices, allowing multiple analog data streams to be carried in the single physical line. While TDM increases the overall utilization of a given line, the length of each time-slice is immutable. Thus, a given data stream is allocated neither more nor less than its fixed time-slice.

More modern telecommunications networks operate on digital (including digitized analog) data. Persons using the network can readily perceive the resulting increases in data fidelity and transmission rate. However, digital data have other advantages that are not so apparent to the user.

One significant such advantage is that a stream of digital data can readily be divided into segments. The segments can be of varying length or fixed length and may be alternatively called "blocks," "packets," "frames" or "cells." Header information, including the path through the network that the segment is to take or the destination to which the segment is heading, is typically provided with the segments. Depending upon the specific protocol, each segment may also be provided with error checking information. Therefore, each segment can be switched individually through the network. In fact, segments corresponding to multiple data streams can be carried on a single line, but the overall bandwidth of the line can be allocated flexibly, such that each stream is allocated bandwidth as needed (enabling so-called "Bandwidth-ON-Demand"). Thus, switching of digital data is not required to suffer the fixed time-slice disadvantages of TDM.

Asynchronous Transfer Mode ("ATM") is becoming an important standard for communication of digital data. In ATM parlance, the segments are contained in "cells." Cells are fixed at 53 octets in length. The leading 5 octets contain header information, while the remaining 48 octets contain the segment itself. The fixed length of the cells allow them to be transported quickly through a network.

It has been found that general purpose computers can be made to control switches. In such computer-controlled switches, a processor provides central control for the communication of data among ports (coupled to inbound and outbound lines) coupled to the processor by a bus. Segments of data are communicated from one port to the processor and back out to another port, the processor acting as bus master at all times. Some computer-controlled switches employ TDM to divide the processor/bus bandwidth evenly among the various ports. Whether or not TDM is employed, the centralized nature of this communication places heavy burdens on the processor and the bus, limiting the effective bandwidth of the computer-controlled switch.

Often, such computer-controlled switches have an open, modular architecture, allowing the switches to be easily expanded. Accordingly, the ports are provided on port cards. However, the port cards have always been under direct control of ("slaved to") the processor.

Accordingly, what is needed in the art is a computer-controlled cell switch that can switch cells reliably and quickly by having decentralized control of cell communication. Preferably, the cell switch should be modular and amenable to an accepted bus standard. More preferably, the cell switch should be amenable to ATM cells.

SUMMARY OF THE INVENTION

To address the above-discussed deficiencies of the prior art, the present invention provides a port card employable in a cell switch including a host computer having a processor and a bus for interconnecting a plurality of port cards and a method of switching cells in the cell switch. The port card includes: (1) bus master circuitry for gaining control of the bus to allow the port card to place cells to be switched in the cell switch and (2) interface circuitry, coupled to the local memory and the bus master circuitry, that places the cells on the bus when the bus master circuitry has gained control of the bus, the cells communicated directly from the interface circuitry to another port card in the cell switch via the bus. The processor (or, more generally, the host computer) is thereby relieved of having to switch the cells.

The present invention therefore introduces a cell switch having modular port cards that have the ability to communicate cells directly among one another. The port cards may be proprietary or non-proprietary telephone interface cards, digital signal processing ("DSP") cards, T1 cards or any other conventional or later-developed cards that can be used to provide an interface between the cell switch and the remainder of a telephone or data network. A local, perhaps shared, memory preferably receives and stores cells to be communicated between the cell switch and the remainder of the network. The present invention is preferably not restricted to TDM, although the cell switch can inter-operate with conventional slave, TDM-based port cards.

When a port card needs to place cells on the bus, the bus master circuitry has the ability to request the bus and act as bus master. The bus interface circuitry then places the cells on the bus. The host computer, while involved in the process of initializing port cards and defining virtual circuits within the cell switch, is not burdened with controlling the actual communication of cells from one port card to another via the bus. It should be understood, however, that the cell switch can operate with conventional port cards that do not have bus master circuitry. In such cases, the host computer receives the cells from the conventional port card and directly controls the routing of cells among conventional port cards.

In one embodiment of the present invention, the interface circuitry is peripheral component interconnect ("PCI") bus interface circuitry having a data bus width of 32 bits. Those skilled in the art are familiar with PCI data buses and their flexibility. Of course, the present invention can operate on other buses that can accommodate a change in bus master.

In one embodiment of the present invention, the cells are 53 octets long, the interface circuitry appending a 3 octet trailer including an index octet (a "PCI index") to each of the cells, the index octet indicating an order of the cells with respect to one another. Thus, the cell with its trailer is 56 octets long. This length is preferably an even multiple of the data width of the bus. If the data width of the bus is 32 bits (4 octets), the 56 octet cell and trailer can be communicated in 14 pieces.

In one embodiment of the present invention, the cells are ATM cells. Those skilled in the art are familiar with ATM cells and their advantages in high-speed switching. The present invention is employable with ATM cells or any other block, packet, frame or cell type.

In one embodiment of the present invention, the port card further includes an inbound cell queue for receiving inbound cells from the other port card, an index octet associated with each of the inbound cells ordering the inbound cells within the inbound cell queue. In an embodiment to be illustrated and described, each port card in a cell switch has an inbound cell queue for each other port card. Thus, in a cell switch having 4 port cards, each port card has 3 inbound cell queues, one corresponding to each possible origin for an inbound cell. This arrangement eliminates potential race conditions that may occur when two port cards are attempting to write to the same inbound cell queue and eliminates a need for queue locking mechanisms. Most preferably, the host computer controls the number or size of inbound cell queues established in each port card.

In one embodiment of the present invention, the host computer is an IBM-compatible computer. While the present invention is not limited to a particular platform or bus type, commercially available IBM-compatible computers are relatively inexpensive, flexible in their open architecture and commonly include a PCI bus, which cooperates advantageously with the present invention.

In one embodiment of the present invention, the bus interface circuitry bursts the cells on the bus (preferably in a single burst cycle). Those skilled in the art are familiar with burst mode data transfers and their associated processing efficiency. The present invention can make use of burst mode transfers to increase the effective bandwidth of the bus.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Before undertaking more detailed discussions of advantageous embodiments of the present invention, the meaning of the following terms and phrases should be understood: the term "or" is inclusive, meaning and/or; the terms "include," "includes" or "including" mean inclusion without limitation and the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like.

Figure 1:
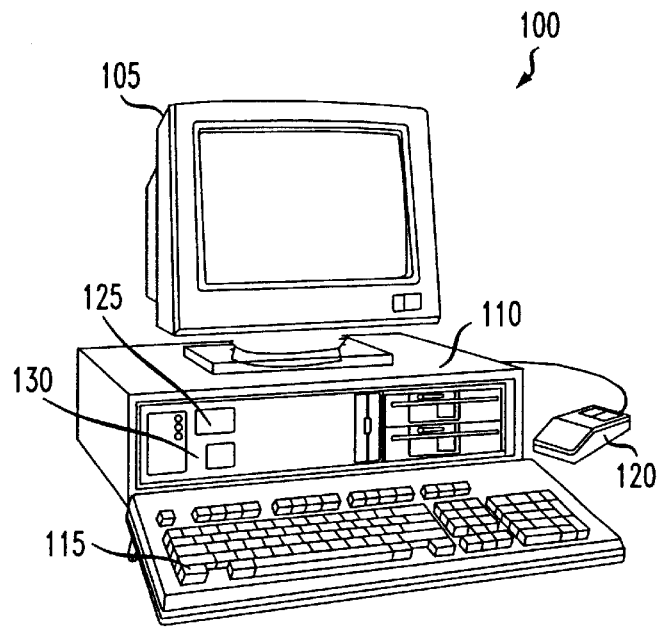
FIG. 1 illustrates an isometric view of an exemplary personal computer ("PC") that may form an environment for the cell switch of the present invention.

Referring initially to FIG. 1, illustrated is an isometric view of a personal computer ("PC") that may form an environment for the cell switch of the present invention. Since the present invention is not limited to application in a personal computing environment, FIG. 1 is illustrative only. In fact, the present invention may advantageously be embodied in a number of cooperating, rack-mountable chasses, providing a more conventional form factor for a cell switch.

The exemplary PC 100 includes a display device or monitor 105, a main chassis 110, within which are various electronic components (discussed with reference to FIG. 2), and a plurality of exemplary conventional user interfaces, including a keyboard 115 and a mouse 120.

The display device 105, keyboard 115 and mouse 120 cooperate to allow communication between the PC 100 and a user (not shown). The main chassis 110 illustratively includes a dedicated hardware reset switch 125 (adapted to trigger hardware reset circuitry (not shown) within the main chassis 110 to reboot or restart the PC 100 when the user depresses the reset switch 125) and a power switch 130 (capable of interrupting and restoring power to the PC 100). Interruption and restoration of power brings about a restart of the PC 100.

The principles of the present invention may alternatively be implemented in any suitable computer processing environment, whether microcomputer, minicomputer, mainframe, supercomputer or the like, including multi- and parallel processing environments.

The term "call processing computer" is occasionally used herein and designates the computer that is executing call processing software or firmware. The host computer may be employed to execute the call processing software or firmware and therefore be known as the call processing computer. Alternatively, the call processing software or firmware may be executed in one or more expansion (or port) cards or in still other processing circuitry. The present invention does not require that the call processing computer be located at a particular location within the overall cell switch.

Figure 2:
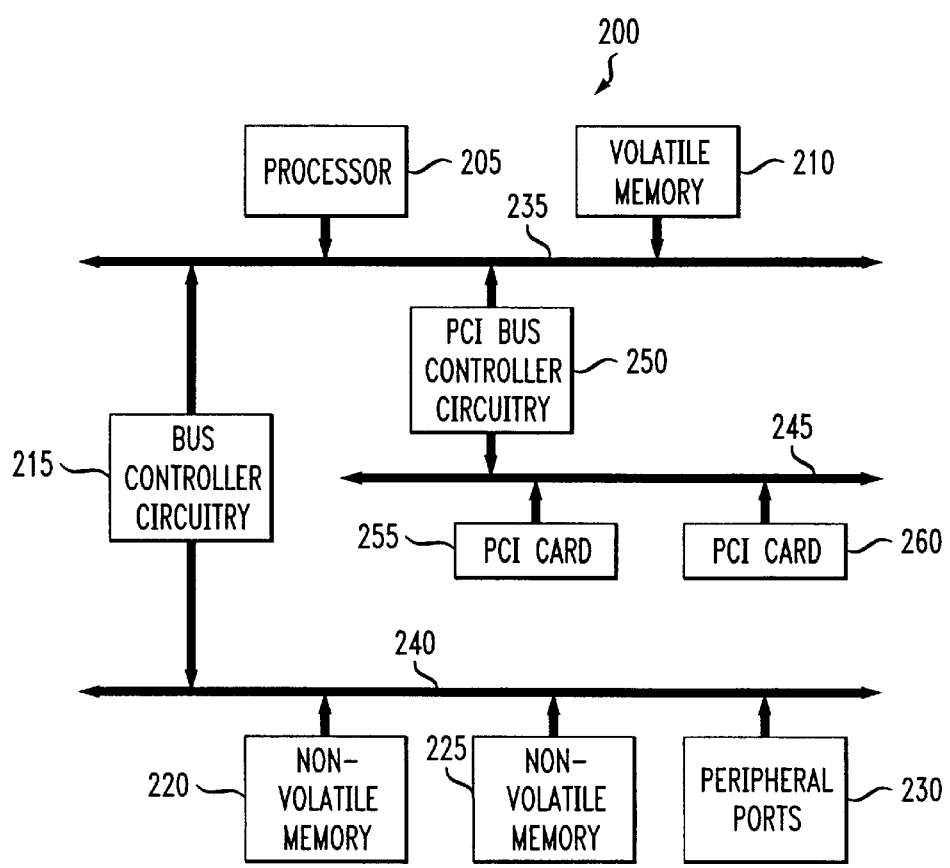
FIG. 2 illustrates a block diagram of an exemplary processing circuit, such as that associated with the exemplary PC, that may suitably provide an environment that allows connections within the cell switch of the present invention to be established and dissolved.

Turning now to FIG. 2, illustrated is a block diagram of an exemplary processing circuit (generally designated 200), such as that associated with the exemplary PC 100, that may suitably provide an environment that allows connections within the cell switch of the present invention to be established and dissolved. Since the present invention is not limited to application in the exemplary processing circuitry 200, FIG. 2, like FIG. 1, is merely illustrative.

The exemplary processing circuitry 200 comprising the host computer includes a processor 205, conventional volatile memory (e.g., random access memory, or "RAM") 210, bus controller circuitry 215, a first conventional non-volatile memory (e.g., read only memory, or "ROM") 220, a second conventional non-volatile memory (e.g., a hard disk drive) 225 and a set of peripheral ports 230. An exemplary host bus 235 is shown and is suitably operative to associate the processor 205, volatile memory 210 and bus controller circuitry 215. An exemplary input/output ("I/O") bus 240 is shown and is operative to associate the bus controller circuitry 215, the first non-volatile memory 220, the second nonvolatile memory 225 and the set of peripheral ports 230. The set of peripheral ports 230 may suitably couple the I/O bus 235 to any one or more of a plurality of conventional peripheral devices for communication therewith. Included among the set of peripheral ports 230 may be one or more serial or parallel ports.

Also shown is a PCI bus 245 coupled to the host bus 235 by a PCI bus controller circuitry 250. The PCI bus 245 is conventionally referred to as a mezzanine bus, in that it is located logically between the relatively fast host bus 235 and the slower I/O bus 240. The PCI bus 245 is provided with a plurality of PCI slots (not shown) that can accept PCI-compliant cards 255, 260. For purposes of this illustrated embodiment, the port cards take the form of PCI cards. Alternatively, the port cards can couple to the I/O bus 240, although the bandwidth of the resulting cell switch would be dramatically lower due to the limited bandwidth of the I/O bus 240.

The bus controller circuitry 215 provides suitable means by which the host bus 235 and the I/O bus 240 may be associated, thereby providing a path and management for communication therebetween. Likewise, the PCI bus controller circuitry 245 provides suitable means by which the host bus 235 and the PCI bus 245 may be associated, also providing a path and management for communication therebetween. Each of the illustrated buses 235, 240, 245 requires a drive current to carry signals thereon. The illustrative circuit accordingly operates in conjunction with a conventional system controller (not shown) that supplies the required drive current.

In alternate advantageous embodiments, processing circuitry 200, which may be associated with exemplary computer systems 100, 200, 205 and 210, may, in whole or in part, be replaced by or combined with any suitable processing configuration, including multi and parallel processing configurations, programmable logic devices, such as programmable array logic ("PALs") and programmable logic arrays ("PLAs"), DSPs, field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should be noted also that while processing circuitry 200 illustratively includes a three-bus configuration, alternate embodiments may include single-bus or dual-bus configurations. Further, conventional computer system architecture (including PCI architecture) is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993); and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference for all purposes.

Figure 3:
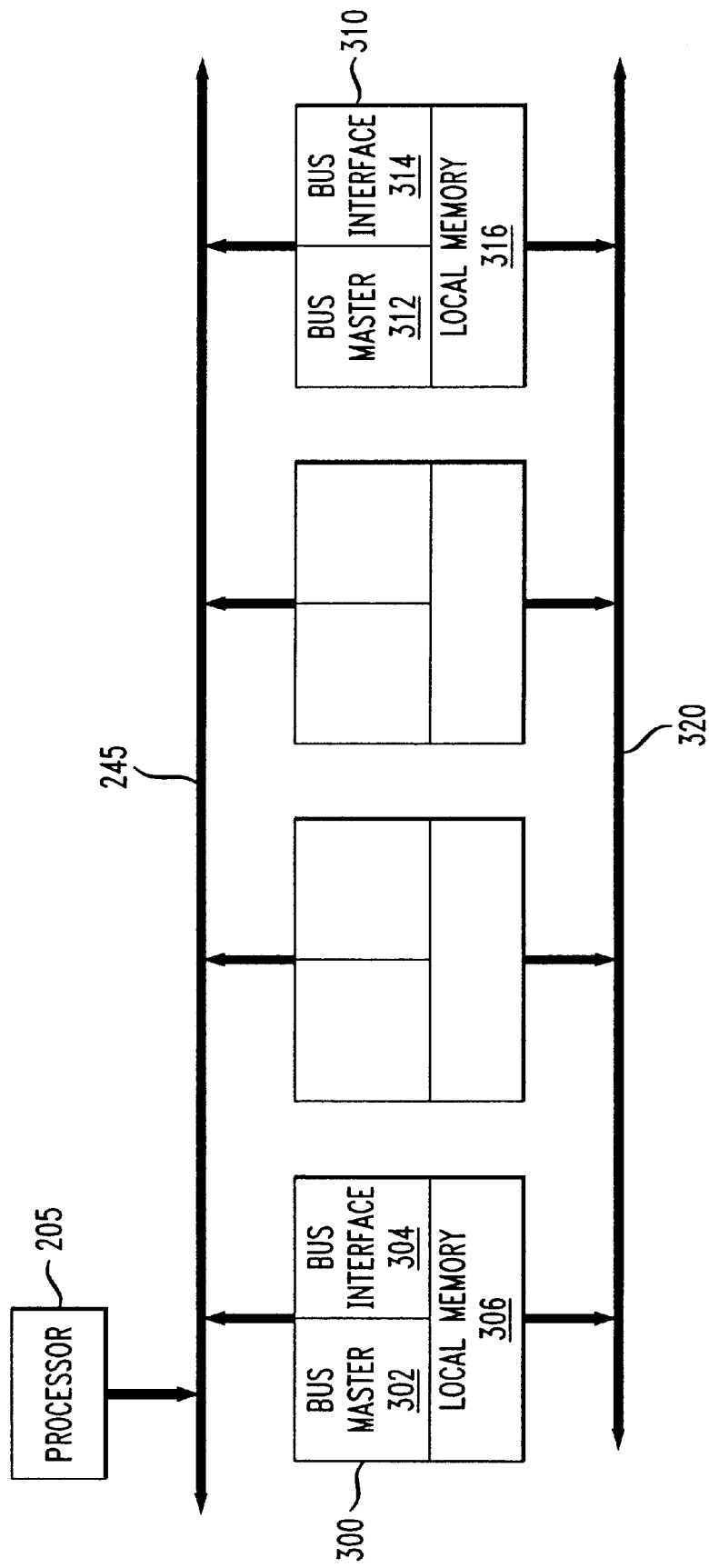
FIG. 3 illustrates a block diagram of a cell switch architecture according to the present invention.

Turning now to FIG. 3, illustrated is a block diagram of a cell switch architecture according to the present invention. The cell switch architecture is embodied within a general purpose computer system and forms a host computer having a processor 205, perhaps of the type illustrated in FIGS. 1 and 2. For sake of simplicity, the intervening host bus 235 and PCI bus controller circuitry 250 are not shown in FIG. 3.

Shown are a plurality of port cards (four), two of which are referenced as 300, 310. The port cards 300, 310 are coupled between the PCI bus 245 and a plurality of inbound and outbound lines 320. The lines 320 may be physically separate from one another, or may be virtual circuits within a single physical line (such as a T1 or Broadband Integrated Services Digital Network, or "BISDN" line). In either case, the port cards 300, 310 are arranged to receive streams of data from, or transmit streams of data to, the lines 320.

FIG. 3 shows four port cards. Those skilled in the art understand that other numbers are within the scope of the present invention, although larger numbers of port cards may require commercially-available PCI bridge circuitry.

Each port card 300, 310 is illustrated as being divided into separate sections. In the port card 300, one such section is PCI bus master circuitry 302. The PCI bus master circuitry 302 is responsible for requesting and gaining control of the PCI bus 245 to manage the communication of data thereover. Software (or firmware or hardware, as the case may be) executing in the port card 300 controls the PCI bus master circuitry 302 to control the PCI bus 245. Those skilled in the art are familiar with both the structure and function of conventional PCI bus master software and circuitry. The PCI bus master circuitry 302 of the present invention is conventional apart from the fact that it is being used, for the first time, to enable distributed cell switching.

PCI bus interface circuitry 304 actually places (bursts) the cells on the bus and receives inbound cells from other port cards. Those skilled in the art are familiar with both the structure and function of conventional PCI bus interface circuitry. The PCI bus interface circuitry 304 of the present invention is conventional apart from the fact that it is being used, for the first time, to enable distributed cell switching.

A local memory 306 is employed to store cells as they are received from the lines 320. Also, outbound cells destined for the lines 320 are stored in the local memory 306. Preferably, the local memory 306 is shared between the bus circuitry 302, 304 and the lines 320 and therefore not necessarily a separate memory.

The port card 310 has corresponding PCI bus master circuitry 312 and PCI bus interface circuitry 314 and a corresponding local memory 316. Again, the local memory 316 may be shared and therefore not necessarily a separate memory.

The port cards 300, 310 may be proprietary or non-proprietary telephone interface cards, DSP cards, T1 cards or any other conventional or later-developed cards that are suitable to receive streams of data from, or transmit streams of data to, the lines 320.

Data flows through the cell switch architecture of FIG. 3 as follows. Inbound cells (not shown) arrive via a physical line (or a virtual circuit therein) of the lines 320 and are received into a local memory of a port card to which the line is coupled. For purposes of this example, a port on the port card 300 receives the data; the data are segmented into 48 octet payloads and temporarily stored in the local memory 306 of the port card 300. At this point, a 5 octet virtual channel header containing a virtual channel identification ("VCI") field is pre-appended to each 48 octet payload and a 3 octet trailer, including a PCI index octet, is post-appended to each payload, yielding 56 octet cells that have a length that is an even multiple of the 32 bit PCI bus width.

Next, the PCI bus master circuitry 202 is prompted to request bus master status. After bus master status is granted, the PCI bus master circuitry 302 directs the PCI bus interface circuitry 304 to place the cells on the PCI bus 245 in a single burst cycle. For purposes of this example, the cells are to be communicated to a port belonging to the port card 310. Thus, the cells are communicated to the port card 310, where they are temporarily stored in an inbound cell queue (not separately referenced, but which may be a shared part of the local memory 316) corresponding to the port card 300.

Next, the cells' PCI indices are checked by the port card 310 to detect cell arrival and verify cell queue integrity. Assuming that all is well, the virtual channel headers of the cells are checked to confirm that the cells belong to an active call. Finally, the cells are moved to the local memory 316 until they can be placed on an outbound line contained within the lines 320.

Under some conditions, such as when a conventional port card is present within the cell switch, the data are required to be transmitted in two steps. First, the data must be transmitted to the host computer under control of the host computer. Second, the data must be transmitted from the host computer to a destination port card (for example the port card 310) under control of the host computer. Normally, however, the actual communication of cells across the PCI bus 245 does not involve the host computer.

Figure 4:
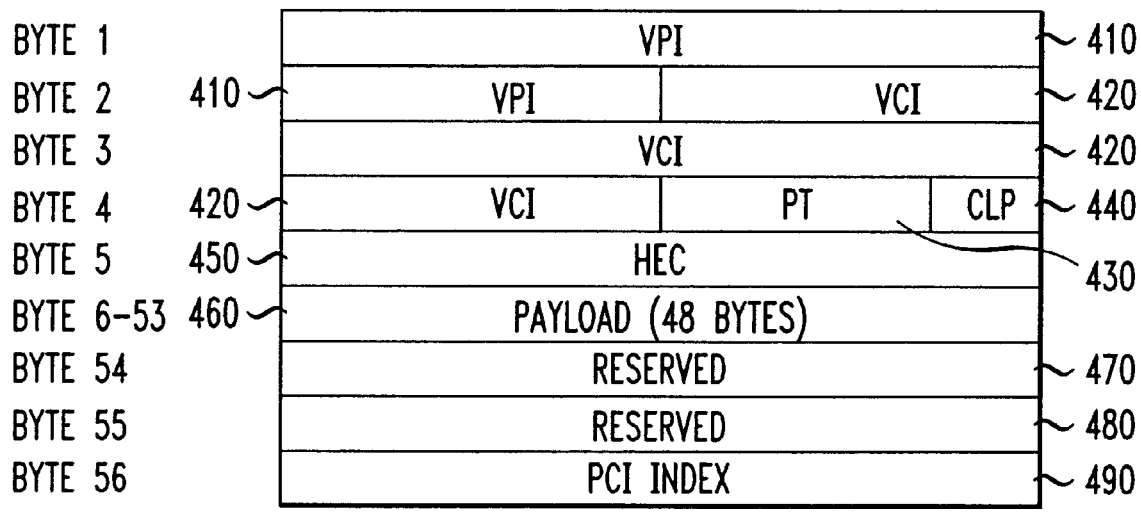
FIG. 4 illustrates an ATM cell format having a 3 octet trailer according to the present invention.

Turning now to FIG. 4, illustrated is an ATM cell format 400 having a 3 octet trailer according to the present invention. Those skilled in the art will recognize the basic cell format 400 as being based on the ATM Network Node Interface ("NNI") header format. Bytes (octets) 1 through 53 (comprising a virtual port identification ("VPI") field 410, a VCI field 420, a payload type ("PT") field 430, a cell loss priority ("CLP") field 440, a header error correction ("HEC") field 450 and a 48 octet payload field 460) constitute a standard ATM cell. Those skilled in the art understand that, in ATM parlance, VPIs and VCIs together identify a virtual circuit.

Added to the standard ATM cell are octets 54 through 56 (comprising two reserved fields 470, 480 and a PCI index field 490). The operation of the PCI index field 490 has been set forth in detail above.

For purposes of the specific implementation of the cell switch described herein, only the bits of the VPI field 410 contained in octet 1 and the bits of the VCI field 420 contained in octet 3 are used; the remaining bits are ignored and no assumptions about their values are made. This allows byte-wise operations to be performed, instead of the bit-wise operations that would be necessary were the full 3.5 octet fields 410, 420 to be used. Of course, in larger cell switches, additional address resolution may require the addition of octet 2 and half of octet 4.

The illustrated embodiment uses the VPI, VCI, PT and CLP fields 410, 420, 430, 440 according to ATM Forum convention. The illustrated embodiment does not employ the HEC field 450. Its value is ignored.

The PCI index field 490 is used to control the inbound cell queues. Each time a cell is communicated, the PCI index is incremented. When the cell is received, its PCI index is checked to determine the order and completeness of the cell. Since the PCI index is communicated last, an incomplete cell lacks at least the PCI index field 490. Being contained in an 8 bit field, the PCI index is incremented from 0 to 255, and then wraps around to 0.

Figure 5:
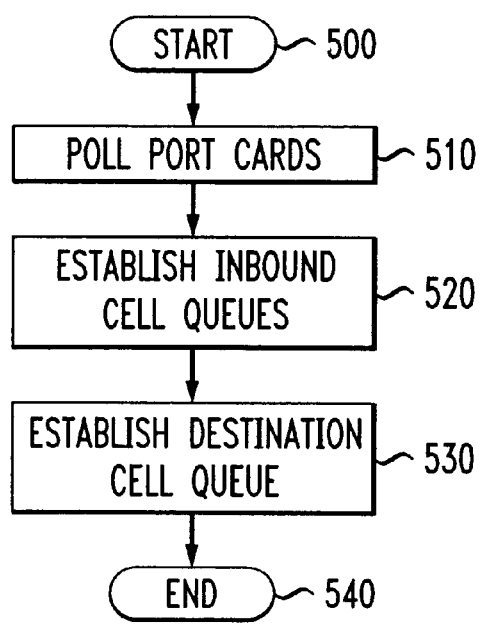
FIG. 5 illustrates a flow diagram of a method of initiating the cell switch according to the present invention.

Turning now to FIG. 5, illustrated is a flow diagram of a method of initiating the cell switch according to the present invention. The method begins in a start block 500 wherein power is applied to the cell switch.

In a block 510, the host computer polls the port cards via the PCI bus to determine the number and type of port cards that are present. Assuming all port cards present are of the type described in FIG. 3, the host computer instructs (in a block 520) each card to establish n inbound cell queues of a given size, where n is 1 less than the total number of port cards present. For example, if 4 port cards are present, the host computer instructs each port card to establish 3 inbound cell queues (one for each card that may send cells to the port card).

Each port card (300, 310 of FIG. 3) predefines a target queue for processor-to-port card communications. The address and size of this target queue is specified in local configuration registers in each port card. The addresses of these configuration registers are device-dependent. The single target queue provides the host computer a mechanism to send messages to the port card. In the illustrated embodiment, the first message the host computer sends notifies the port card of the address and size of its corresponding host target queue. The host computer then directs each port card to create new inbound cell queues for each additional port card in the cell switch. Once the new inbound cell queues have been established, each port card communicates their addresses to the host computer.

In a block 530, the host computer also informs each port card of the address of their corresponding inbound cell queue ("destination cell queue") on the other port cards. The method then ends in an end block 540.

Figure 6:
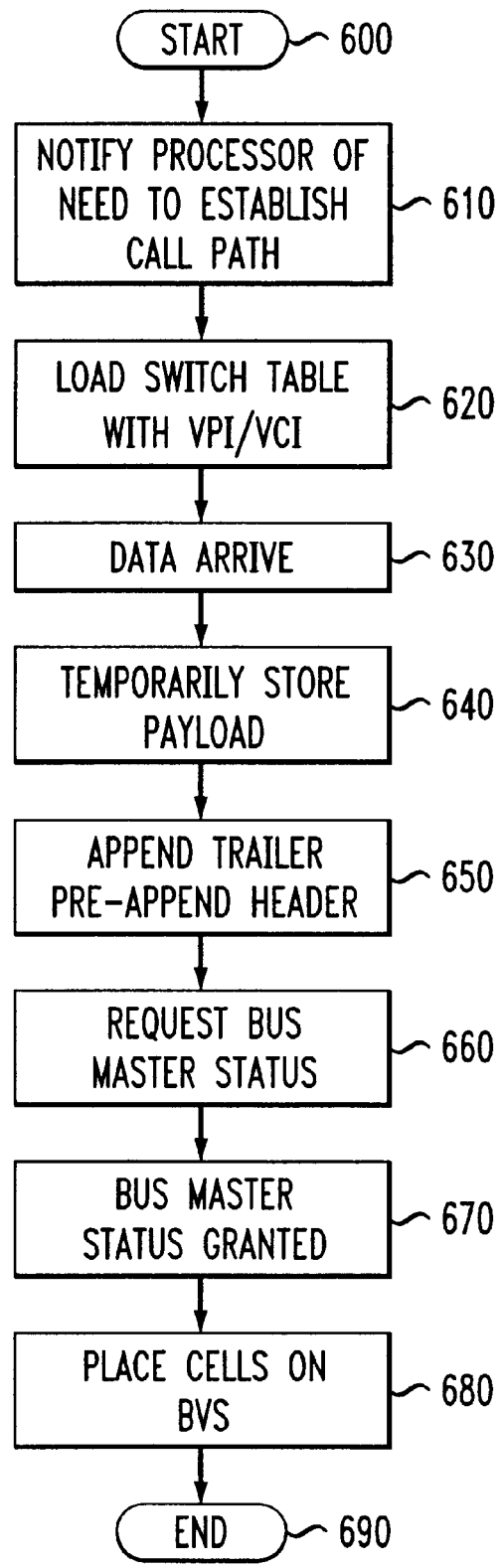
FIG. 6 illustrates a flow diagram of a method of switching cells according to the present invention.

Turning now to FIG. 6, illustrated is a flow diagram of a method of switching cells according to the present invention. Processing begins in a start block 600, when a particular port card senses (by detecting conventional signals received from the endpoint) that an endpoint to which it is connected seeks to initiate a call. The port card responds to the signal (in a block 610) by notifying the call processing computer that a call path through the switch needs to be established. The call processing computer responds (in a block 620) by assigning a VPI/VCI for the path and loading an entry in the port card's cell switch table that corresponds to the destination port card.

In a block 630, data to be switched in the cell switch arrive via an incoming line. In a block 640, the port card segments the data into 48 octet payloads and temporarily stores cells to be switched in its local memory. In a block 650, the 5 octet header is pre-appended and the 3 octet trailer is appended to the 48 octet payload. In a block 660, PCI bus master circuitry requests bus master status. In a block 670, bus master status is granted. The port card therefore has gained control of the bus to allow the interface circuitry of the port card to place the cells on the bus. In a block 680, the port card places the cells on the bus, preferably by placing the bus in a conventional burst mode. The cells are directly communicated from the interface circuitry to another port card in the cell switch via the bus, thereby relieving the host computer of having to switch the cells centrally. The cells are received into the inbound cell queue of the other port card and the PCI indices checked to establish the order and completeness of the cells.

The method ends in an end block 690, wherein the port card receives an indication (by means of conventional signals from an endpoint) that the call is to end. The port card notifies the host computer, which responds by dissolving the call path by deleting the corresponding entry in the port card's cell switch table.

From the above, it is apparent that the present invention provides a port card employable in a cell switch including a host computer having a processor and a bus for interconnecting a plurality of port cards and a method of switching cells in the cell switch. The port card includes: (1) a local memory for temporarily storing cells to be switched in the cell switch, (2) bus master circuitry for gaining control of the bus to allow the port card to place the cells on the bus and (3) interface circuitry, coupled to the local memory and the bus master circuitry, that places the cells on the bus when the bus master circuitry has gained control of the bus, the cells communicated directly from the interface circuitry to another port card in the cell switch via the bus, the processor thereby relieved of having to switch the cells.

Although the present invention has been described in detail, those skilled in the art should understand that they can make various changes, substitutions and alterations herein without departing from the spirit and scope of the invention in its broadest form.

What is claimed is:

1. A port card, employable in a cell switch including a host computer having a processor and a bus for interconnecting a plurality of port cards, said port card comprising:
   local memory for containing cells to be switched in said cell switch;
   bus master circuitry for gaining control of said bus to allow said port card to place said cells on said bus; and
   interface circuitry, coupled to said local memory and said bus master circuitry, that places said cells on said bus when said bus master circuitry has gained control of said bus, said cells communicated directly from said interface circuitry to another port card in said cell switch via said bus, said processor thereby relieved of having to switch said cells.

2. The port card as recited in claim 1 wherein said interface circuitry is peripheral component interconnect (PCI) bus interface circuitry having a data bus width of 32 bits.

3. The port card as recited in claim 1 wherein said cells are 53 octets long, said interface circuitry appending a 3 octet trailer including an index octet to each of said cells, said index octet indicating an order of said cells with respect to one another.

4. The port card as recited in claim 1 wherein said cells are asynchronous transfer mode (ATM) cells.

5. The port card as recited in claim 1 further comprising an inbound cell queue for receiving inbound cells from said other port card, an index octet associated with each of said inbound cells ordering said inbound cells within said inbound cell queue.

6. The port card as recited in claim 1 wherein said host computer is an IBM-compatible computer.

7. The port card as recited in claim 1 wherein said bus interface circuitry bursts said cells on said bus.

8. A method of switching cells with a port card employable in a cell switch, said cell switch including a host computer having a processor and a bus for interconnecting a plurality of port cards, said method comprising the steps of:
   gaining control of said bus to allow said port card to place cells to be switched in said cell switch on said bus;
   placing said cells on said bus when said bus master circuitry has gained control of said bus; and
   directly communicating said cells from said interface circuitry to another port card in said cell switch via said bus, said processor thereby relieved of having to switch said cells.

9. The method as recited in claim 8 wherein said step of placing comprises the step of placing said cells on a component interconnect (PCI) bus having a data bus width of 32 bits.

10. The method as recited in claim 8 wherein said cells are 53 octets long, said method further comprising the step of appending a 3 octet trailer including an index octet to each of said cells, said index octet indicating an order of said cells with respect to one another.

11. The method as recited in claim 8 wherein said cells are asynchronous transfer mode (ATM) cells.

12. The method as recited in claim 8 further comprising the step of receiving inbound cells from said other port card into an inbound cell queue, an index octet associated with each of said inbound cells ordering said inbound cells within said inbound cell queue.

13. The method as recited in claim 8 wherein said host computer is an IBM-compatible computer.

14. The method as recited in claim 8 wherein said step of placing comprises the step of bursting said cells on said bus.

15. A cell switch, comprising:
   a host computer, including:
      a processor for performing call processing tasks, and
      a peripheral component interconnect (PCI) bus, coupled to said processor; and
   a plurality of port cards, each of said plurality of port cards including:
      a local memory for temporarily storing cells to be switched in said cell switch,
      PCI bus master circuitry for gaining control of said PCI bus to allow said port card to place said cells on said PCI bus, and
      interface circuitry, coupled to said local memory and said PCI bus master circuitry, that places said cells on said PCI bus when said PCI bus master circuitry has gained control of said PCI bus, said cells communicated directly from said interface circuitry to another one of said plurality of port cards via said PCI bus, said switching of said cells thereby distributed within said cell switch.

16. The cell switch as recited in claim 15 wherein said plurality of port cards are selected from the group consisting of:

a Digital communications Protocol (DCP) card, a Display System Protocol (DSP) card, an SBC card, and a T1 card.

17. The cell switch as recited in claim 15 wherein said cells are 53 octets long, said interface circuitry appending a 3 octet trailer including an index octet to each of said cells, said index octet indicating an order of said cells with respect to one another.

18. The cell switch as recited in claim 15 wherein said cells are asynchronous transfer mode (ATM) cells.

19. The cell switch as recited in claim 15 further comprising an inbound cell queue for receiving inbound cells from said other one of said plurality of port cards, an index octet associated with each of said inbound cells ordering said inbound cells within said inbound cell queue.

20. The cell switch as recited in claim 15 wherein said host computer is an IBM-compatible computer.

21. The cell switch as recited in claim 15 wherein said PCI bus interface circuitry bursts said cells on said PCI bus.

* * * * *